United States Patent [19]

Sears

[11] 3,961,753
[45] June 8, 1976

[54] IRRIGATION SYSTEM CONTROLLER

[75] Inventor: Charles Kenneth Sears, Tucson, Ariz.

[73] Assignee: International Electric Co., Chicago, Ill.

[22] Filed: Oct. 6, 1975

[21] Appl. No.: 619,854

[52] U.S. Cl. .............................. 239/64; 239/542; 73/73; 324/65 R; 340/235; 340/239 S
[51] Int. Cl.² .................. A01G 25/16; A01G 27/00
[58] Field of Search ..................... 239/63, 64, 542; 340/235, 239 S; 324/65 R, 65 P; 73/73; 137/392

[56] References Cited
UNITED STATES PATENTS

| | | | |
|---|---|---|---|
| 2,611,643 | 9/1952 | Higgins | 340/235 X |
| 2,621,233 | 12/1952 | Spalding | 73/73 X |
| 2,878,671 | 3/1959 | Prosser et al. | 222/549 X |
| 2,911,156 | 11/1959 | Freeman | 239/63 |
| 2,985,827 | 5/1961 | Hasenkamp | 73/73 X |
| 3,024,372 | 3/1962 | Seele | 239/63 X |
| 3,118,606 | 1/1964 | Rotunda | 239/63 |
| 3,771,548 | 11/1973 | Rauchwerger | 340/235 X |
| 3,843,056 | 10/1974 | Nye | 239/64 |
| 3,859,594 | 1/1975 | Grindheim | 324/65 R X |

Primary Examiner—Robert S. Ward, Jr.
Attorney, Agent, or Firm—Rummler & Snow

[57] ABSTRACT

An irrigation system controller that operationally ties the dispensing of water to the soil directly to the need thereof without requiring continuous monitoring by the irrigation manager. If a preselected water supply period is not sufficient to attain a desired moisture content in the soil due either to an insufficient estimate on the part of the manager or a power or equipment failure or unforeseen change in weather, a warning device or other electrically-operated signal calls attention to the need for the selection of a new longer water supply period or a correction of the power or equipment failure. A pushbutton switch resets the warning system. If the preselected water supply period is sufficient to maintain the desired moisture content, a feed-back loop automatically controls the dispensation of water to maintain the desired moisture content of the soil.

13 Claims, 8 Drawing Figures

IRRIGATION SYSTEM CONTROLLER

BACKGROUND OF THE INVENTION

In grove management, though "drip irrigation"techniques do make it practically impossible to drown a tree by totally cutting off its oxygen supply, control of water oversupply by drip irrigation means does present some problems if crop yields are to be consistently maintained. In orchards, the drip line of a tree is closely associated with the development of the tree's root system. Drip lines in general fall under the outer extent of the canopy of the tree and it is from here that the watershed of the tree naturally irrigates. For optimum control, moisture sensors are best located at the drip line and for optimum distribution, emitters are best spaced around the trunk of the tree just inside and outside the drip line. Good practice in grove management with existing irrigation systems has found it necessary to maintain close monitoring of the systems by the grove manager on a systematic basis if crop yields are to be consistently maintained therewith.

It is characteristic in the irrigation of orchards that a time lag occurs between the time that the error in the moisture content is sensed at a control point in the orchard and the time that a correcting dispensation of water arrives from the emitter some distance away. Time lags in irrigation control systems produce dynamic errors in the current moisture content valves and make irrigation management a closely monitored occupation for the grove manager. In citrus grove management, a temporary overshoot or a continuous instability in the supply of water to the grove can lead to disturbances of tree function and the falling off in production of fruit. Reestablishing production of a disturbed tree can take a very long time. With present-day irrigating equipment, disturbances of tree function can only be eliminated by close monitoring of the soil moisture content around the tree by the irrigation manager.

Reduction of tree disturbance without the need for close monitoring can be had by using fully-automatic feed-back control. Fully-automatic controls that have the capability of coping with the time lags associated with orchard irrigation that lead to tree dormancy are in general mechanically and electrically complex and costly in the first instance and expensive to maintain.

Complexity and cost of an irrigation control can be reduced if a fully-automatic, modulated-pulse width rather than an analog control system is used. Analog controls correct water dispensation to the soil by modulating pump valving or pump speed to vary pump output. Modulated-pulse width controls correct water dispensation by changing pump output at constant speed over varying periods of time. Modulated-pulse width controls do, however, tend to accentuate the aforementioned time lag effects more than do their analog counterparts and, for that reason, are economically unacceptable for orchard irrigation applications.

Unmodulated-pulse width feed-back irrigation controls, having dual setpoints which correct for both errors in deficiency and errors of oversupply of water, are the least expensive of control systems suitable for irrigation applications. In unmodulated-pulse width, dual setpoint irrigation systems, the change in water supply to correct a measured soil moisture content is achieved by "on-off" operation of a constant speed pump for set periods of time. A range of moisture contents is set between which operation is deemed satisfactory and water control periods are preselected which are capable of supplying the water needed therefor. The unmodulated-pulse width, dual setpoint control for irrigation application is mechanically and electrically simpler and less costly than the modulated-pulse or analog type but also tends to accentuate the time lag effects unless closely monitored. For this reason, such systems are likewise uneconomical for irrigation applications.

There is thus an established need for a controller for an irrigation system which maintains crop production at top yield at all times without the need for close monitoring by the irrigation manager in on-the-spot correcting for overshoots and instabilities in the supply of water dispensed thereto.

SUMMARY OF THE INVENTION

The gist of this invention lies in a controller of an irrigating system having a conventional constant-speed pump capable of operating in the on-off mode in cooperation with standardized piping for supplying water for drip-irrigating the orchard by means of standard irrigation emitters. The controller provides for the supply of unmodulated pulses of water from the pump to the system for preselected times called "water control periods" which are entirely at the option of the irrigation manager when the moisture content at the control point in the soil is below a preset lower value. The controller does not so provide water when the moisture content is above a preset upper value, but does continue to provide water for a one-hour base period daily only.

A first moisture-sensing feedback circuit in the controller which cooperates with the irrigating system comprises an actuating tensiometer which is inserted in the soil at the control point at some distance from the point of application of the emitters. The feed-back circuit has a first comparator cooperatively connected to the actuating tensiometer which discriminates as to the presence of a first level moisture deficiency in the soil and signals the system to supply the pulses of water for the preselected water control periods until the lower preset moisture content thereat is reached.

An alternative moisture-sensing feed-back circuit comprises an evaporimeter constructed and installed in the manner described by Jensen and Middleton, "Scheduling Irrigation from Pan Evaporation", Circular 527, Wash. Agric. Exper. Sta., Nov. 1970.

A warning system having a beacon light or similar electrically-operated device cooperates with the first feed-back circuit to call the irrigation manager's attention to the need for the selection of a new longer water control period if, under the existing selection of the same and the cumulative deficit in moisture in the soil at the control point, the irrigation system does not have the inherent capability to supply sufficient water to attain the preset moisture content desired. A testing tensiometer which is inserted in the soil adjacent to the actuating tensiometer has a second comparator cooperatively connected thereto which also discriminates as to when an error of second level moisture deficiency exists in the soil thereat at a level slightly more deficient then the first whereupon the beacon light is signaled of the existence of said second level deficiency. A pushbutton switch resets the warning system upon the selection of a new, longer water control period for the irrigation system by the irrigation manager.

THE PREFERRED EMBODIMENTS

Figure 1:
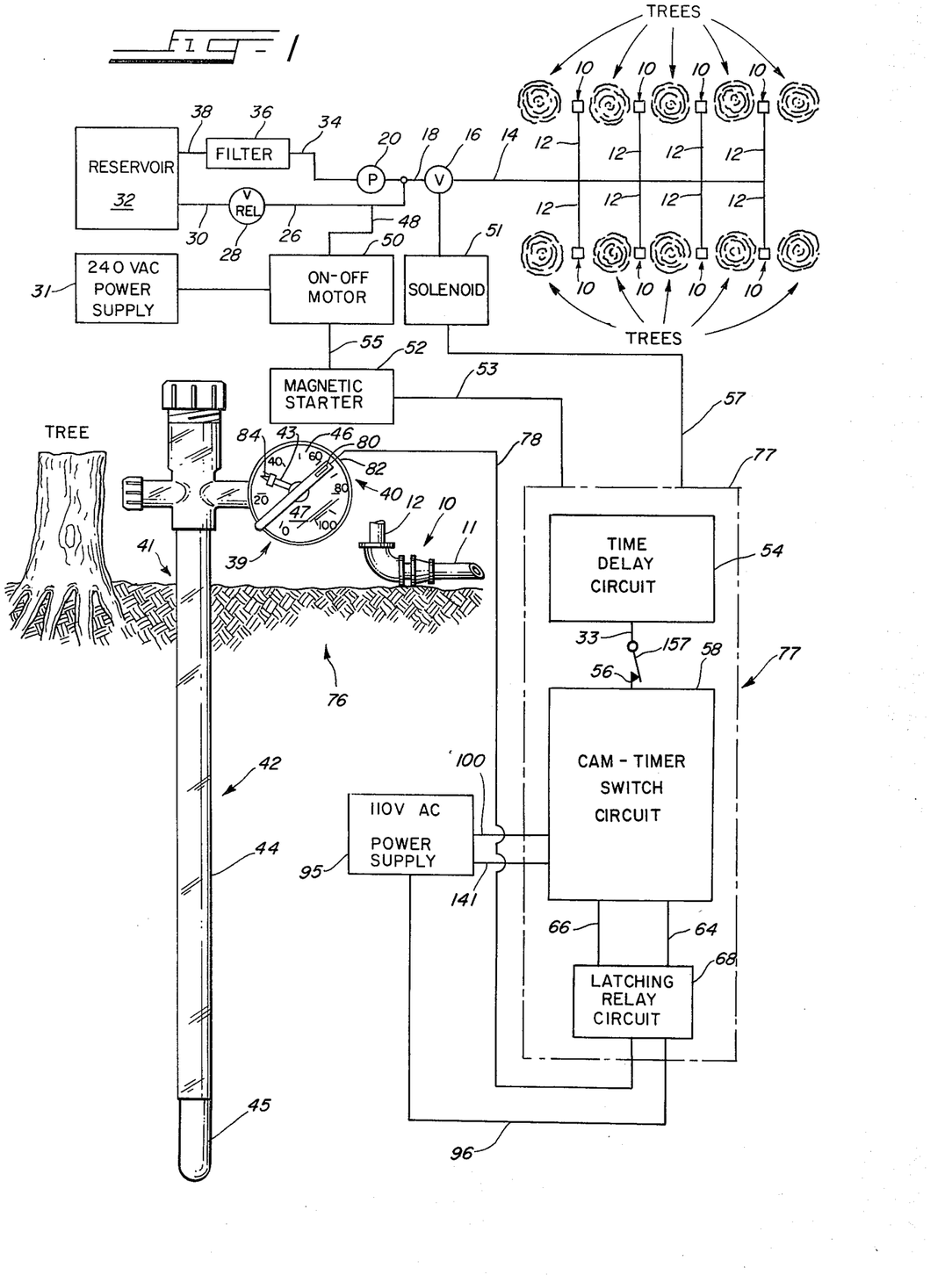
FIG. 1 shows a schematic block diagram of the irrigation system according to the teachings of this invention.

A soil moisture content control system, as shown in FIG. 1, comprises a pump 20 which is connected to a reservoir 32, a filter 36 which is incorporated in the pipelines 38 and 34 that lead from the reservoir 32 to the inlet of the pump 20, and a pressure relief valve 28 which is incorporated in bypass pipelines 26 and 30 that lead from a line 18 at the outlet of the pump 20 back to the reservoir 32, which valve 28 maintains the pressure of the water supplied to the system at a constant level when the pump 20 is delivering water during a water control period. A 220 volt A.C. induction motor 50 turns a drive shaft 48 which in turn drives pump 20. A shutoff valve 16 in the pipeline 18 downstream of the outlet of pump 20 and the connection of bypass line 26 therein prevents back flow from the water distribution system to the pump 20 when the pump-driving motor 50 is stopped.

The piping layout for the soil moisture content control system is comprised of a lateral pipe 14 which leads from the outlet of the shutoff valve 16 and which has a plurality of runner pipes 12 each with a water emitter 10 at its terminal end connected to the pipe 14 along its respective length for supplying the water to the soil at the locations of emitters 10. Emitters 10 comprise tubular members 11 laid on the surface of the ground adjacent to the roots of the trees and separated by some distance from the point of installation of soil moisture test system 76 at the soil moisture control point 41.

Dispensation of water to the soil is accomplished by on-off control of the pump driving motor 50 which operationally connects with the pump 20 in supplying water to the system at a constant pressure for preselected water control periods. Water is dispensed to the soil on a daily basis in direct proportion to the length of this time period. A magnetic starter 52 operationally connects to the motor 50 through an electrical conductor 55 providing the on-off control of pump-driving motor 50 and pump 20 for the preselected water control periods which are chosen by the irrigation manager as necessary to attain a desired moisture content of the soil.

A solenoid 51 operationally connects to valve 16 providing out-flow "shut-off" capability of water flow from the pump 20 and back-flow prevention from the emitters 10 out of pipe 14 into the pump 20 when motor 50 is not operating in a water control period.

A water control period selector means or electrical control circuit 77 connects its output to magnetic starter 52 through conductor 53 and to solenoid 51 through conductor 57. Control circuit 77 comprises a time-delay circuit 54 having its outputs connecting to conductors 53 and 57, a pushbutton switch and first cam timer circuit 58 connecting to the input thereto through series-connected conductors 33 and 56 having N.C. toggle switch 157 connected therebetween. The pushbutton switch and cam timer circuit 58 connects to 120-volt A.C. power supply 95 through conductors 100 and 141. A first latching relay circuit 68 connects with pushbutton switch and cam timer circuit 58 through an "actuate" electric conductor 64 and a "reset" electric conductor 66 which automatically connect these circuits 58 and 68 in mutually-alternative operating sequence. Latching relay circuit 68 connects to 110-volt A.C. power supply 95 through conductor 96.

A soil moisture content sensing and comparing member 76 of the soil moisture control system connects with latching relay circuit 68 through electric conductor 78. A moisture sensor portion 39 of member 76, for sensing the soil moisture content at the control point, comprises a soil moisture content sensing means or actuating tensiometer 42 constructed in accordance with the teachings of U.S. Pat. No. 2,878,671, having a long tubular body 44 which is in fluid communication with a moisture sensing head 45 connected at the lower end thereof, embeds in the soil at the dripline control point 41. A transducer means or dial-type vacuum gage 46, graduated to read out in centibars on a dial face 47 and having a gage vacuum-indicating pointer 43 pivotally mounted in central location on the face thereof, connects to and is in fluid communication with the tensiometer 42 through the chamber 29 thereof, as disclosed in the above patent, by means of the bore 32 and the nipple 33 therein.

A soil moisture content comparator means 40 of member 76, for discriminating whether the error in soil moisture content at the control point is below setpoint value, comprises a magnet 84 which mounts on the outer radial extremity of the vacuum-indicating pointer 43 relative to the pivotal center thereof; a soil moisture content single setpoint means or setpoint pointer 82 which mounts on the face of the gage 46 above the vacuum pointer 43 where it is constrained to pivot in concentric relation thereto about the pivotal center thereof remaining in adaptation therewith in any one set position thereon by frictional means; a magnetically-actuatable reed switch 80 which mounts on the outer radial extremity of the moisture setpoint pointer 82 positioned to operationally cooperate with the magnet 84 on the vacuum pointer 43 in the actuation thereof, whereby a readout by vacuum pointer 43 indicating a higher vacuum than that set by setpoint pointer 82 signals a moisture content in the soil below that desired.

Figure 2:
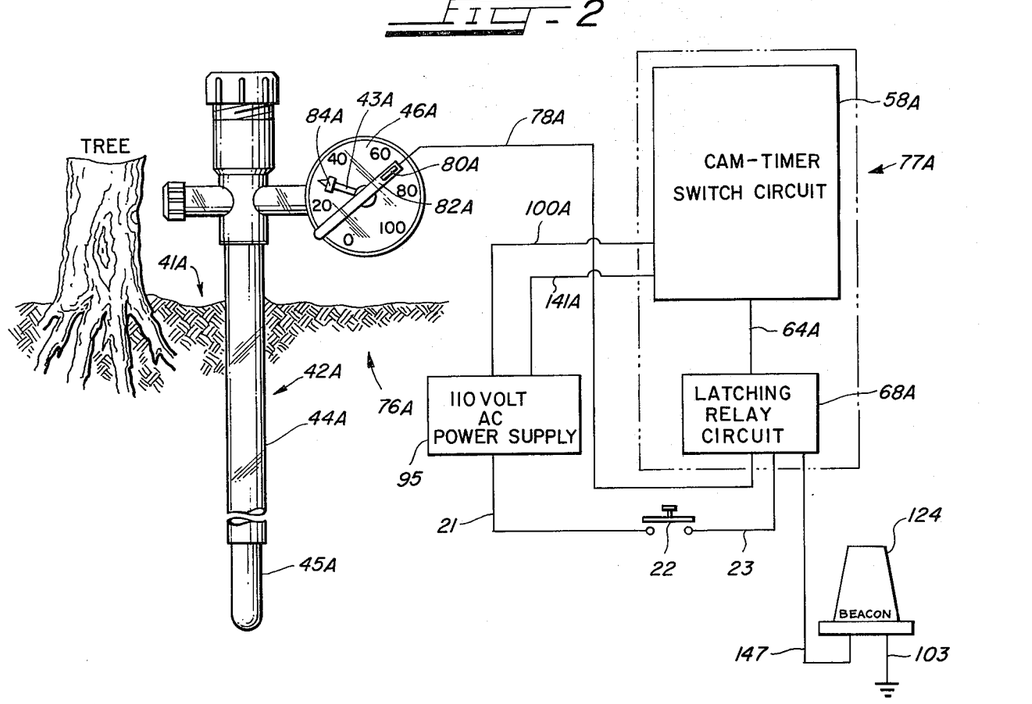
FIG. 2 shows a schematic block diagram of the warning system of the same.

A low moisture content warning system, as shown in FIG. 2, comprises a beacon light 124 mounted on a pole (not shown) which is located in a prominent position in the grove; an electric control circuit 77A having its output connected to the input of the beacon 124 through conductor 147 and having a second latching relay circuit 68A also connected therethrough; a second cam timer circuit 58A connecting with the latching relay circuit 68A through an actuate conductor 63A; a cam timer switch circuit 58A connecting to 120-volt A.C. power supply 95 through conductors 100A and 141A, respectively; and a latching relay circuit 68A connected to 120-volt A.C. power supply 95 through series-connected conductors 21 and 23 having N.O. manually-operated reset switch 22 inserted therebetween.

Soil moisture content sensing means 76A comprises a testing tensiometer 42A, having identical elements to those in the moisture control actuating tensiometer 42, in which vacuum pointer 43A on transducer means gage 46A mounts comparator means magnet 84A and setpoint indicating pointer 82A pivotally mounts on the face of gage 46A in concentric relation thereto; a magnetically-actuatable reed switch 80A again mounts on pointer 82A so as to operationally cooperate with the magnet 84A on pointer 43A, as in the case of actuating tensiometer 42. Again, an indication by vacuum pointer 43A of higher vacuum that that indicated by setpoint pointer 82A indicates a moisture content below that desired.

Figure 3:
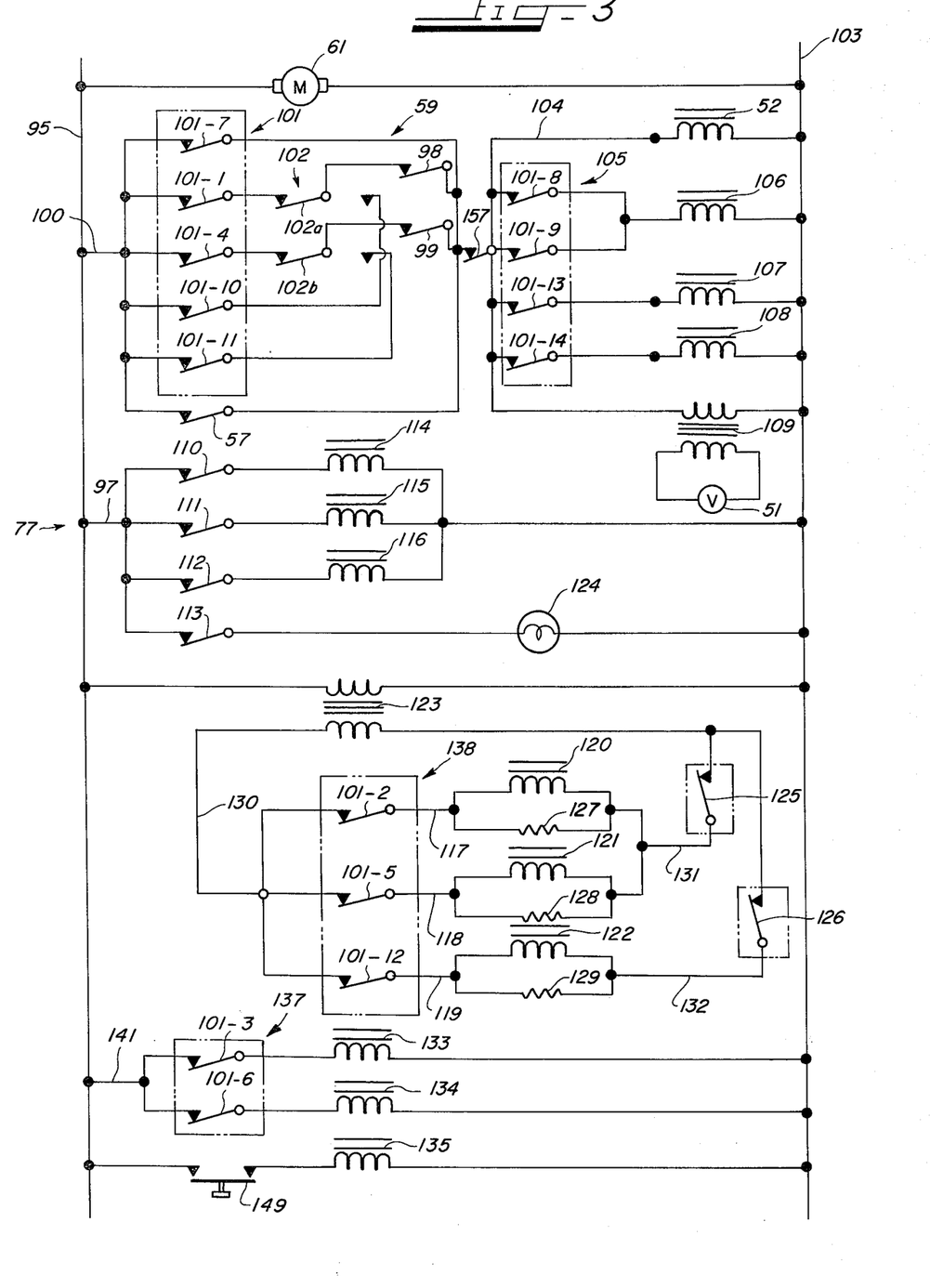
FIG. 3 shows the electrical circuit diagram for one version of the invention having two optional water control periods.

One version of the electrical control circuit 77, as shown in FIG. 3, having two optional water control periods selectable by the operator, comprises a first block, five-cam, 24-hour timing assembly 101 having cam-operated switches 101-1, 101-4, 101-7, 101-10 and 101-11 all electrically connected at their inputs through a common electrical conductor 100 to a 110-volt A.C., 60-cycle power supply 95 and operationally connected to a cam shaft 93 (not shown) driven by clock motor 61. DPDT switch 102 has one input of the first switch 102a connected to the output from switch 101-1 and the other input of the second switch 102b connected to the output from switch 101-4. The other input of the first switch 102a connects to the output from switch 101-10 while the other input of the second switch 102b connects to the output from switch 101-11. The input to contacts 98 of latching relay 114/98 connects to the output from the first switch 102a and the input to contacts 99 of latching relay 115/99 connects to the output from second switch 102b. The outputs of contacts 98 and 99 connect to common electrical conductor 59. Switch 101-7 connects between conductors 100 and 59 to provide a daily 1-hour flushing cycle regardless of moisture content of soil. Normally-open, manually-operated switch 57 connects between conductor 100 and conductor 59.

The input of switch 157 connects to the output of conductor 59. The output of switch 157 connects to common conductor 104.

A second block, four-cam, 24-hour timing assembly 105 is operable off the same cam shaft 93 (not shown) as the first timing assembly 101 and has cam-operated switches 101-8, 101-9, 101-13 and 101-14 all connected at their inputs through a common electrical conductor 104 to the output of switch 157. The input to solenoid coil 106 for operating a sodium hypochloride additive valve (not shown) connects to the output from switches 101-8 and 101-9. Ground 103 connects to the output from solenoid coil 106.

The input to solenoid coil 107 for operating a fertilizer additive valve (not shown) connects to the output from switch 101-13. Ground 13 connects to the output from solenoid coil 107. The input to solenoid coil 108 for operating an additional additive valve (not shown) connects to the output from switch 101-14. Ground 103 connects to the output from solenoid 108. The input to the coil of magnetic starter coil 52 connects to the output of common conductor 104. Ground 103 connects to the output of the magnetic starter coil 52. The input to the first primary terminal of transformer 109 connects with the conductor 104. Ground 103 connects to the output of the second primary terminal of transformer 109. The terminals of solenoid coil 51 connect across the output of the secondary of transformer 109. The electrical input to clock motor 61 for powering the timing assembly 101 connects to 110 volt A.C., 60-cycle power supply 95. Ground 103 connects to the output of clock motor 61.

Inputs to relay contacts 110–113 are all connected through a common electrical conductor 97 to 110-volt A.C., 60-cycle power supply 95. Inputs to the coils 114, 115 and 116 of latching relays 114/98, 115/99 and 116/113 connect to the outputs of contacts 110, 111 and 112, respectively. Ground 103 connects to the output from coils 114, 115 and 116 of latching relaays 114/98, 115/99 and 116/113, respectively. Latching relay coils 114, 115 and 116 actuate latching relay contacts 98, 99 and 113, respectively.

A third block, three-cam, 24-hour timing assembly 138 is operable off the same cam shaft 93 (not shown) as the first and second timing assemblies 101 and 105 and has cam-operated switches 101-2, 101-5 and 101-12 all connected at their inputs through a common electrical conductor 130 to the first terminal of the secondary of a transformer 123 having its primary connected across from 120-volt A.C. power supply 95 to ground 103. The outputs from switches 101-2, 101-5 and 101-12 connect to the inputs and provide 24 -volt power to coils 120, 121 and 122 which are shunted by resistors 127, 128 and 129, respectively. Coils 120, 121 and 122 with contacts 110, 111, 112 form high-impedance relays 120/110, 121/111 and 122/112, respectively. Coil 116, which is in the circuit with the contacts 112 of relay 122/112 between the common conductor 97 and ground 103, cooperates with contacts 113 of latching relay 116/113 which is in the circuit with the beacon light 124 between power supply 95 and ground 103.

First terminal of primary of transformer 123 connects to 120 volt A.C., 60-cycle power supply 95. Ground 103 connects to the second terminal of primary of transformer 123. Inputs to cam-operated switches 101-2, 101-5 and 101-12, which are part of the third timing assembly 127, connect with the first terminal of secondary of transformer 123 through a common electrical conductor 130. Inputs to coil 120 of high impedance relay 120/110 for actuating relay contact 110 and shunt 127 connect with output from switch 101-2 through a common conductor 117. Inputs to coil 121 of relay 121/111 for actuating relay contact 111 and shunt 128 connect with output from switch 101-5 through a common conductor 118. Inputs to coil 122 of high impedance relay 122/112 for actuating relay contacts 112 and shunt 129 connect with output from switch 101-12 through a common conductor 119. Input to actuating tensiometer reed switch 125 connects to common electrical conductor 131 connecting to the outputs of coils 120 and 121 and shunts 127 and 128. Input to testing tensiometer reed switch 126 connects to common electrical conductor 132 connecting to the outputs of coil 122 and shunt 129. Outputs from activating and testing tensiometer reed switches 125 and 126 connect to the second terminal of the secondary circuit of transformer 123.

A fourth block, two-cam, 24-hour timing assembly 137 is operable off the same cam shaft 93 (not shown) as the first, second and third timing assemblies 101, 105 and 138 and has cam-operated switches 101-3 and 101-6 both connected at their inputs through a common electrical conductor 141 to the 120-volt A.C. power supply 95. Inputs to reset coils 133 and 134 of reset relays 133 and 134 connect to the outputs of switches 101-3 and 101-6, respectively. Ground 103 connects to the outputs from reset coils 133 and 134. Reset relay coils 133 and 134 and relay coils 120 and 121 operationally cooperate. Input to reset relay 135 connects to the output of button switch 149. Ground 103 connects to the output from reset coil 135. Reset relay coil 135 and relay coil 122 operationally cooperate.

Figure 4:
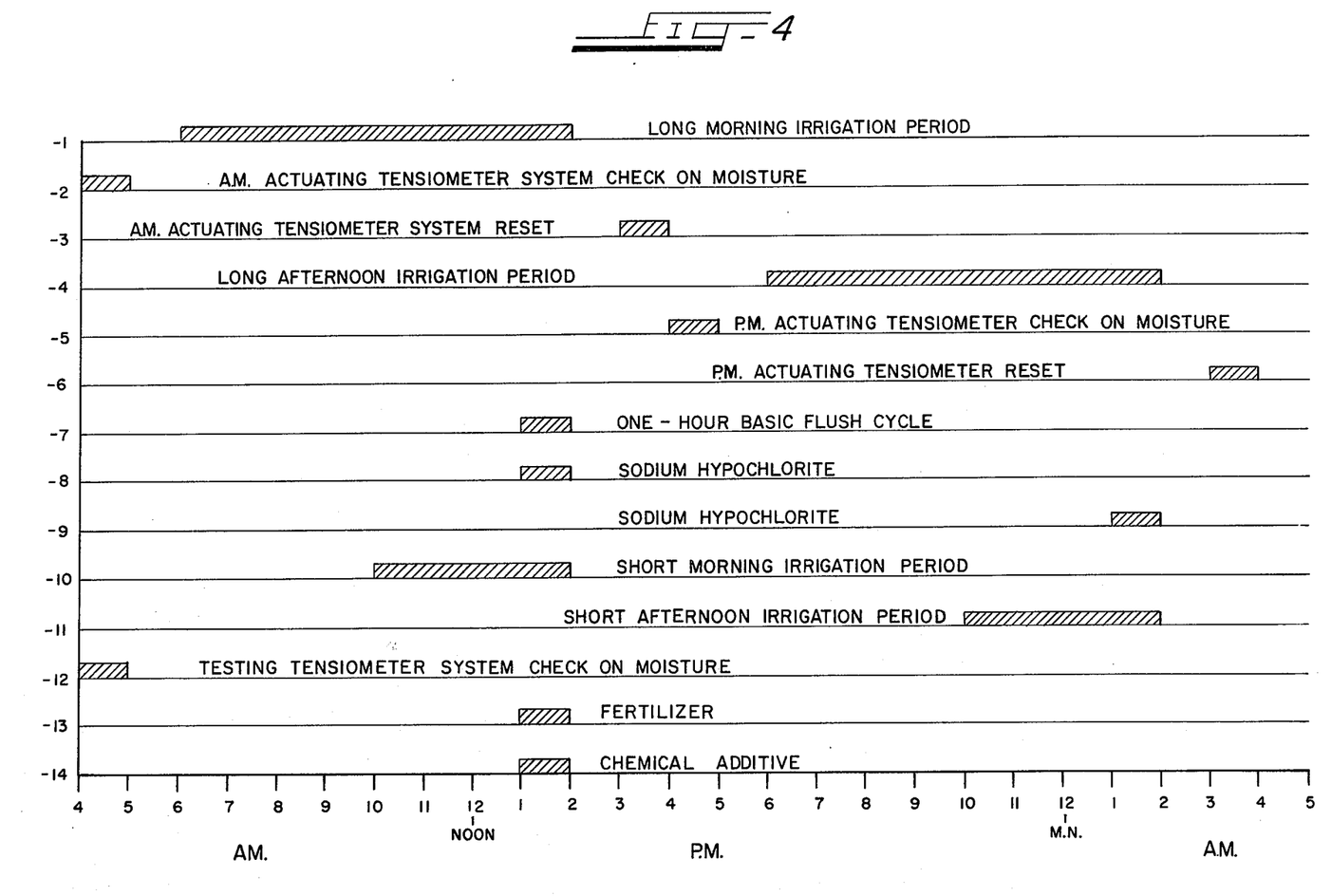
FIG. 4 shows the available selective water control periods for the electrical circuit of FIG. 3.

In the operation of the first version of the irrigation controller of this invention, FIG. 4 shows two optional water control periods selectable by the operator comprising an 8-hour water control period from 6:00 a.m. to 2:00 p.m. controlled by switch 101-1 and a similar water control period from 6:00 p.m. 2:00 a.m. controlled by switch 101-4. Cam-operated switch 101-7 on the timing assembly 101 separately provides power for one base hour of water dispensation from 1:00 p.m. to 2:00 p.m. whether there is any water demand or not.

While two 8-hour periods are available each day under the first option, the irrigation takes place only if the actuating tensiometer reed switch 125 at the control point in the soil calls for moisture. The high impedance relay 120/110 connects to the actuating tensiometer reed switch 125 through switch 101-2 in the timing assembly 101 just prior to the daytime irrigation cycle. If the soil needs moisture, the actuating tensiometer reed switch 125 will be closed. A closed tensiometer reed switch 125, when cam-actuated switch 101-2 closes, energizes high-impedance coil 120 which is part of relay 120/110 and contacts 110 are closed. Closing contacts 110 energizes coil 114 of latching relay 114/98 for starting the morning irrigation cycle.

Following the morning cycle, cam-operated switch 101-3 of the timing assembly 137 energizes relay coil 133, which restores relay 114/98, whose armature is latched to that of relay 133, to its pretest position.

Relay contacts 111 acting through and connecting with cam-operated switch 101-5 of the timing assembly 138 then investigate the moisture condition at the control points 41 just prior to the evening irrigation cycle. If the soil again needs moisture, the actuating tensiometer switch 125 will be closed and N.O. latching relay 115/99 operationally connected therewith is energized for starting the evening cycle as the result of the action of relay contacts 111.

Following the evening cycle, cam-operated switch 101-6 of the timing assembly 137 energizes relay coil 134, which restores relay 115/99, whose armature is latched to that of relay 134, to its pretest position.

Once a day, cam-operated switch 101-12 of the timing block 138 provides 24-volt power to a testing tensiometer reed switch 126 through high impedance relay coil 122 which connects to the testing tensiometer reed switch 126. Should this tensiometer reed switch 126 show the need for more moisture, then the relay contacts 112 will turn on a beacon light 124 through latching relay contacts 113 indicating to the operator that the water control period currently operating is too small. Beacon 124 is turned off when momentary-contact pushbutton switch 149 closes the circuit to relay coil 135, whose armature is latched to relay coil 116/113, and thus resets the signal system to the pretest position.

Cam-operated switches 101-8 and 101-9 of the timing assembly 104 are timed to operate the solenoid valve 106 that introduces sodium hypochloride near the end of each irrigation cycle. Cam-operated switches 101-10 and 101-11 of the timing assembly 101 give the operator the added option of choosing another water control period lesser than 8 hours by throwing double-pole switch 102 connecting the main power supply circuit thereto instead of to cam-operated switches 101-1 and 101-4.

Actuating and testing tensiometer reed switches 125 and 126, respectively, used in this irrigation system are modified from the disclosed in U.S. Pat. No. 2,978,671 to Prosser et al. to indicate desired setpoint values of moisture content in the soil at the control point where installed. Normally-open, magnetically-actuated reed switch 80 operationally connects with permanent magnet element 84 which mounts on the pointer 43 of the gage 46 so that when the magnetic element 84 and said reed switch 80 are in close proximity to each other, the electrical contacts of the reed switch 80 are closed.

The cam-operated switch 101-7 of the timing assembly 101 provides a basic daily irrigation time of one hour regardless of the lack of demand for water as sensed by the actuating tensiometer 125 unless its circuit is opened by N.C. button switch 157 which opens the circuit between conductor 59 and conductor 104.

Testing tensiometer 126 energizes the high-impedance coil 122 of relay 122/112 at set predetermined times if the moisture content of the soil is below setpoint and cam-operated switch 101-12 which is in the third timing assembly 138 of the control circuit 77, as shown in FIGS. 1 and 2, is closed. Activating tensiometer 125 energizes both high-impedance coils 120 and 121 of relays 120/110 and 121/111 during the set water control periods as predetermined above if cam-operated switches 101-2 and 101-5 which are also in the third timing assembly 138 of the control circuit 77 are closed and the moisture content of the soil is below setpoint. Both tensiometers 125 and 126 receive 24-volt A.C. power supply through the secondary circuit of a step-down transformer 123 which is connected between the 120-volt A.C. power supply 95 and ground 103. Relays 120/110 and 121/111 coils 120 and 121 are in series with activating tensiometer reed switch 125. Relay 122/112 coil 122 is in series with testing tensiometer reed switch 126. When the actuating tensiometer reed switch 125 indicates that more moisture is required than can be supplied during the basic 1-hour period, then for the morning cycle relay 120/110 closes its contacts 110 and actuates latching relay 114/98, and for the evening cycle relay 121/111 closes its contacts 111 and actuates latching relay 115/99. The latching relay 114/98 contacts 98 connect with one of the cam-operated switches 101-1 or 101-10 that have been previously selected to supplement the one-hour irrigation during the morning cycle, and latching relay 115/99 contacts 99 connect with one of the cam-operated switches 101-10 or 101-11 during the evening cycle.

The high-impedance relay 122/112 is supplied with 24-volt A.C. power from the secondary of transformer 123 through cam-operated switch 101-12 for a short period of time out of each 24-hour cycle. Since the coil 122 of relay 122/112 is also in series with the contacts of a testing tensiometer reed switch 126, relay 122/112 is energized only if these contacts are closed at the same time that cam-operated switch 101-12 contacts are closed. 430-ohm resistors 127, 128 and 129 across all coils 120, 121 and 122 of relays 120/110, 121/111 and 122/112 overcome possible damage to the contacts of tensiometer reed switches 125 and 126 from the small inductive kick from opening the circuit to the relay coils 120, 121 and 122.

In the event that the moisture does not attain the set amount, then the testing tensiometer reed switch 126 activates latching relay 116/113 through relay 122/112. The contacts 113 of latching relay 116/113 which are operated by coil 116 are in series with a beacon 124. This will operate the beacon light 124 will call attention to the need for correcting the choice of base irrigation water control period. Cam-operated switch 101-3 of the fourth timing assembly 137 resets latching relay 114/98 by energizing relay coil 133, whose armature is mechanically latched with the armature of relay 114/98. Cam-operated switch 101-6 of the fourth timing assembly 137 resets latching relay 115/99 by energizing relay coil 134, whose armature is mechanically latched with the armature of relay 115/99. N.O. momentary-contact, manually-operated pushbutton switch 149 resets latching relay 116/113 and turns off beacon 124 by energizing relay coil 135, whose armature is mechanically latched to the armature of relay 116/113. Reset clears the system for another test by tensiometer 126 in the next 24-hour period.

Figures 5, 8:
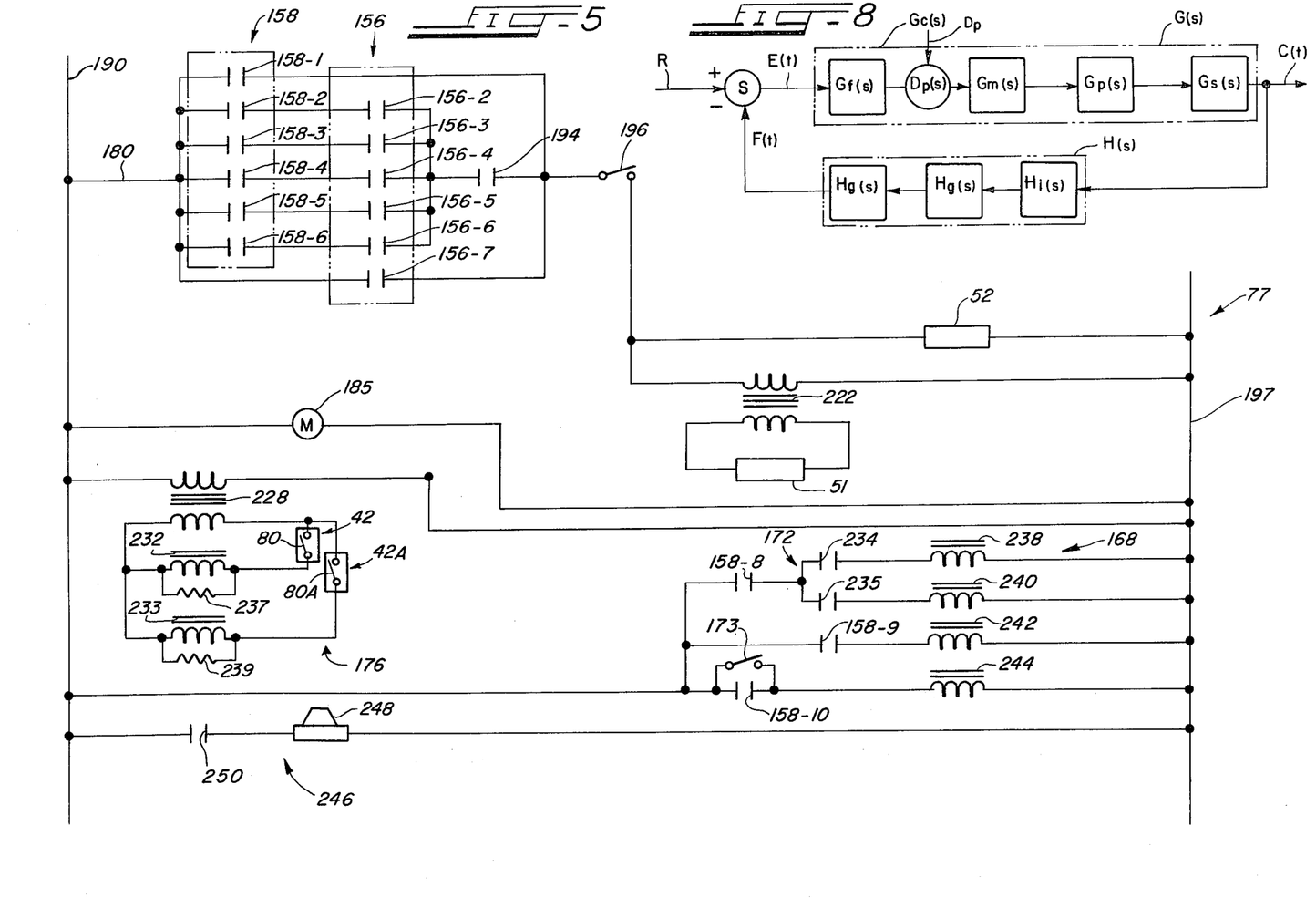
FIG. 5 shows the electrical circuit diagram for an alternate version of the invention having six optional water control periods.
FIG. 8 shows a block diagram of the irrigation controller system.

Referring to the electrical diagram, as shown in FIG. 5, of the alternative electrical control circuit 77 for the irrigation system, the inputs of each of the N.O. cam switches 158-1 through 158-6 electrically connect through common conductor 180 to 110 volt A.C. power bus 190. A constant speed electric motor 185 drives all cams for actuating cam switches 158-1 through 158-6 on a common cam shaft 187 (not shown). The input to motor 185 electrically connects to 110-volt A.C. power supply 190 and the output therefrom to ground 197. Interlock switchblock 156 having N.O. button switches 156-2 through 156-6 has each of its inputs connected to the outputs from cam switches 158-2 through 158-6, respectively. A N.O. button switch 156-7 which is part of switchblock 156 has its input electrically connected to common conductor 180.

A N.O. switch 194 has its input electrically connected to each of the outputs from the button switches 156-2 through 156-6. An on-off switch 196 has its input electrically connected to the output from switch 194, the output from the cam switch 158-1 and the output from the button switch 156-7.

Magnetic starter 52 is connected between switch 196 and ground 197. A first step-down transformer 222 having first terminal on its primary coil electrically connected to the output of switch 196 has second terminal thereon connected to ground 197. The secondary coil of said transformer 222 electrically connects through the solenoid 51 of valve 16, as shown in FIG. 1. The tensiometer circuit 176 comprises a second step-down transformer 228 which has its first terminal on its primary coil electrically connected to a 110-volt A.C. power supply 190. The second terminal on the primary coil thereof electrically connects to ground 197. The secondary coil of said transformer 228 has its first terminal thereon electrically connected to the inputs of coils 232 and 233 of a first high impedance relay 232/234 and a second high impedance relay 233/235, respectively, and its second terminal thereon electically connected to the common output terminals on the magnetically-actuated reed switch 80 mounted on the dial face of the gage 46 of the actuating tensiometer 42, as shown in FIG. 1 (125, as shown in FIG. 3), and on the magnetically-actuated reed switch 80A mounted on the dial face of the gage 46A of testing tensiometer 42A, as shown in FIG. 2 (126, as shown in FIG. 3). The input terminals of reed switches 80 and 80A electrically connect to the outputs from the coils 232 and 233 of relays 232/234 and 233/235, respectively. Coils 232 and 233 are shunted by resistances 237 and 239, respectively.

Switch circuit 172 comprises normally-open contacts 234 of relay 232/234 which operationally connect with coil 232 and N.O. contacts 235 of relay 233/235 which operationally connect with coil 233. The inputs to both sets of contacts 234 and 235 electrically connect to the output of a first cam switch 158-8, also actuated by cam shaft 187. The input to switch 158-8 electrically connects to the 110-volt A.C. power supply 190. A second cam switch 158-9, also actuated by cam shaft 187, also has its input electrically connected to the 110-volt A.C. power supply 190. A third N.O. cam switch 158-10, again actuated by the common cam shaft 187, again has its input electrically connected to the 110-volt A.C. power supply 190. A N.O. momentary-contact pushbutton switch 173 electrically connects in parallel circuit with switch 158-10.

Latching relay circuit 168 comprises a first latching relay 238/194 having the input of its coil 238 electrically connected to the output of contacts 234 of relay 232/234 and its output thereof connected to ground 197. A second latching relay 240/250 has the input of its coil 240 electrically connected to the output of contacts 235 of relay 233/235 and its output thereof connected to ground 197. A third latching relay 242 has the input of its coil 242 electrically connected to the output of switch 158-9 of cam-operated timer circuit 158 and its output thereof connected to ground 197. A fourth latching relay 244 has the input of its coil 244 electrically connected to the outputs of parallel-connected N.O. pushbutton switch 173 and cam-operated switch 158-10 in shunt therewith and its output thereof connected to ground 197.

A beacon light circuit 246 comprises a beacon light 248 having its input electrically connected to the output from N.O. contacts 250 of latching relay 240/250 and its outputs connected to ground 197. The input to contacts 250 electrically connects to the 110-volt A.C. power supply 190.

In the latching relay circuit 168, the contacts 194 operationally connect with the latching relay 238/194, and the contacts 250 operationally connect with the latching relay 240/250.

Figure 6:
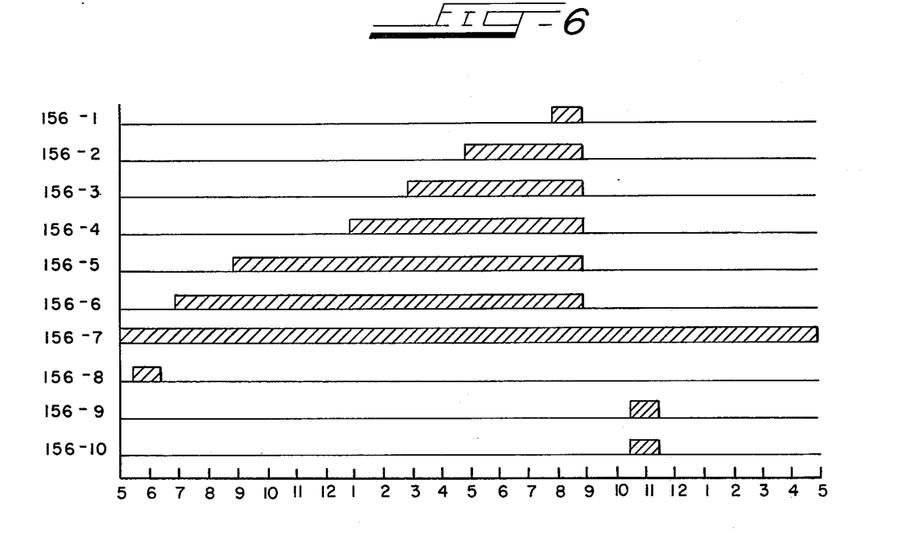
FIG. 6 shows the available selective water control periods for the electrical circuit of FIG. 5.

In the operation of the alternate version of this invention, FIG. 6 shows five optional water control periods selectable by the operator from N.O. interlocking button switches 156 comprising individual switches 156-2 through 156-6, as shown in FIG. 5, which can be set for optional 4, 6, 8, 12 and 14 hour water control periods, respectively. N.O. button switch 156-7 bypasses all the cam switches 158-1 through 158-6 and provides for continuous irrigation. N.O. button switch 156-7, when closed, bypasses all cam switches 158 and provides for continuous irrigation.

Button switch 156-1 (not shown), which has no electrical connection, when depressed, will disconnect interlocking switches 156-2, -3, -4, -5, -6 and -7. Cam switch 158-1 will then provide the basic one-hour flushing period. Normally-closed, manually-operated switch 196, when opened, will shut down magnetic starter 52 and solenoid 51.

Cam switch 158-1 and button switch 156-7 are connected to bypass switch 194 and go directly to the input of switch 196. Cam switches 158-2 through 158-6 must go through contacts 194 of latching relay 238/194 to connect with the input of switch 196. When button 156-1 is not depressed, then one of the manually-selected switches 158-2 through 158-6 is electrically in parallel with switch 158-1.

Prior to the start of any irrigation period, cam switch 158-8 closes for a short time to make 110-volt A.C. power available to contacts 234 and 235.

The reed switches of tensiometers 42 and 42A operate high-impedance relays 232/234 and 233/235, respectively, through step-down transformer 228. Relay coil 232 is in series with the reed switch of actuating tensiometer 42. Relay coil 233 is in series with the reed switch of testing tensiometer 42A. When tensiometer 42 indicates that more moisture is required that can be supplied during the basic one-hour period, the relay 232/234 closes its contacts and actuates latching relay 238/194. Latching relay 238/194 connects in one of cam switches 158-2 through 158-6 that have been previously selected by the operator pushing a button choosing a 156-2 through 156-6 water control period to add to the first hour's irrigation.

In the event that the moisture content in the soil at the control point does not attain the setpoint amount working under the limitation of amount of water supplied during any one water control period fixed by the particular button of hand switches 156 chosen, testing tensiometer 42A actuates latching relay 240/250 through relay 233/235. This operates the beacon light 248 which calls attention to the need for correcting the choice of irrigation times. Following the conclusion of the longest possible water control period, cam switch 158-9 closes and operates relay coil 242, whose armature is mechanically latched to relay 238/294, which restores relay 238/194 to its pretest position. At the same time, cam switch 158-10 closes and operates relay coil 244, whose armature is mechanically latched to the armature of relay 240/250, which restores relay 240/250 to its pretest position. Normally-open, momentary-contact pushbutton switch 173, which is in parallel with cam switch 158-10, permits an operator to turn off beacon 124 manually.

Figure 7:
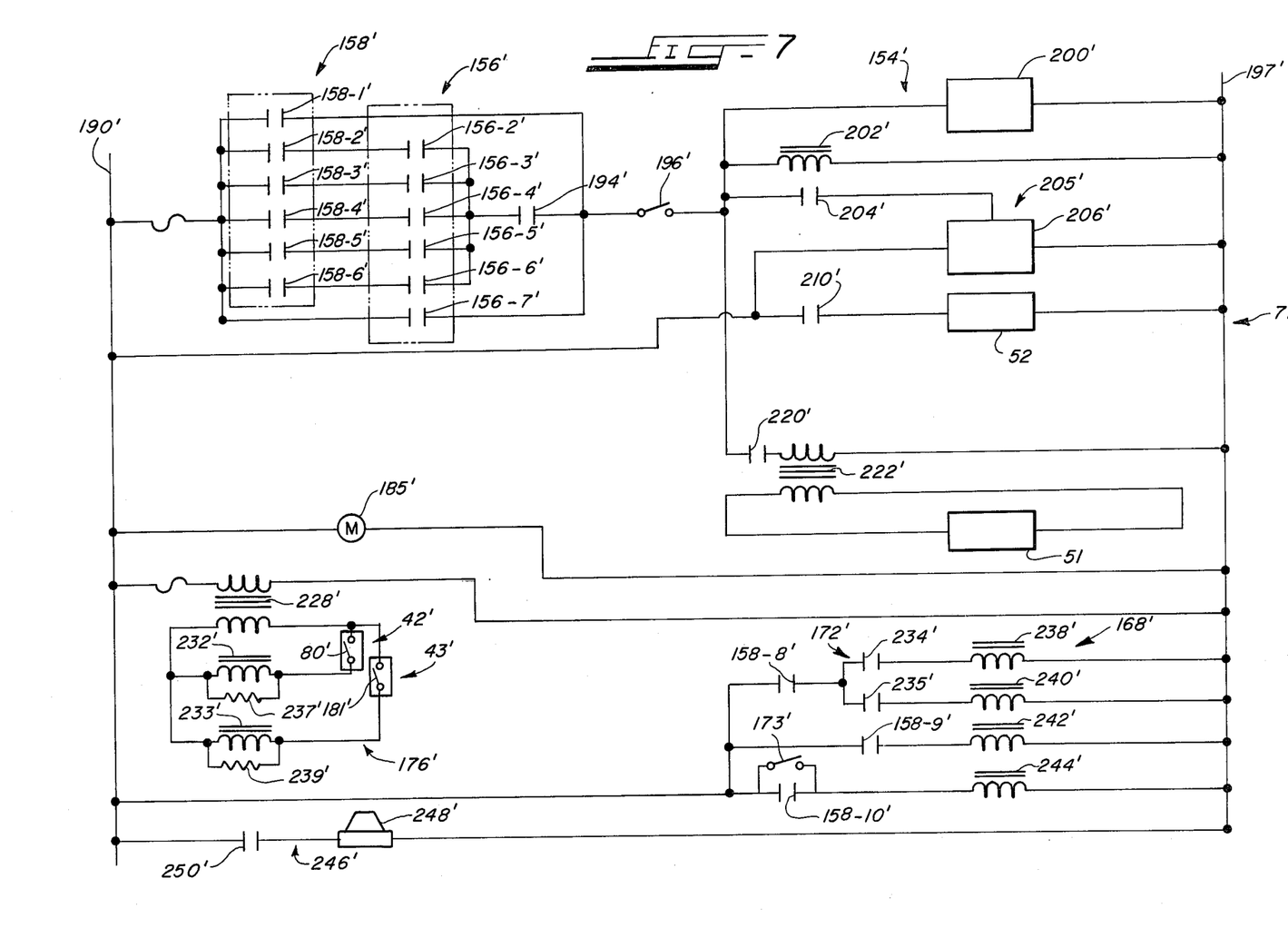
FIG. 7 shows an electrical circuit diagram for the alternate version of FIG. 5 incorporating a time delay means for preventing back flow.

Referring to the electrical diagram, as shown in FIG. 7, of the alternative electrical control circuit 77' for the irrigation system having time delay, the input of each of the N.O. cam switches 158-1' through 158-6' electrically connect to 110-volt A.C. power bus 190'. A clock motor 185' drives all cams for actuating cam switches 158-1' through 158-6' a common cam shaft 187' (not shown). The input to motor 185' electrically connects to 110-volt A.C. power supply 190' and the output therefrom to ground 197'. Interlock switchblock 156' having N.O. button switches 156-2' through 156-6' has each of its inputs connected to the outputs from cam switches 158-2' through 158-6', respectively. A N.O. button switch 156-7' which is part of switchblock 156 has its input electrically connected to 110-volt A.C. power supply 190'. A N.O. switch 194' has its input electrically connected to each of the outputs from the button switches 156-2' through 156-6'. An on-off switch 196' has its input electrically connected to the output from switch 194', the output from the cam switch 158-1' and the output from the button switch 156-7'.

A time delay circuit 154' comprises an on-delay relay 200/220' associated with the solenoid 51 which has input 200' electrically connected to the output of the on-off switch 196' and its output connected to ground 197', the contacts 220' thereof operationally connect with the input 200' thereof and have their input electrically connected to the output of switch 196'. The coil 202' of a first relay 202/204' has its input electrically connected to the output of switch 196' and its output connected to ground 197', the contacts 204' thereof operationally connected with the coil 202' and their input electrically connected to the output of switch 196'. An off-delay relay 206/210' associated with the magnetic starter 52 has a control input 205' electrically connected to the output from contacts 204' of relay 202/204' and another input electrically connected to 110-volt A.C. power bus 190' and its output connected to ground 197'. N.O. contacts 210' operationally connect with time delay relay 206/210' and have their input electrically connected to 120-volt A.C. power supply 190'. A magnetic starter 52 has an input which is electrically connected with the output from contacts 210' and another output connected to ground 197'.

A first step-down transformer 222' having its first terminal on its primary coil electrically connected to the output of contacts 220' has its second terminal connected to ground 197'. The secondary coil of said transformer 222' electrically connects through the solenoid 51 of valve 16, as shown in FIG. 1. The tensiometer circuit 176' comprises a second step-down transformer 228' which has its first terminal on its primary coil electrically connected to a 120-volt A.C. power supply 190'. The second terminal on the primary coil thereof electrically connects to ground 197'. The secondary coil of said transformer 228' in electrical cooperation with said primary coil has its first terminal thereon electrically connected to the inputs of coils 232' and 233' of a first high impedance relay 232/234' and a second high impedance relay 233/235', respectively, and its second terminal thereon electrically connected to the common output terminals on the magnetically-actuated reed switch 80 mounted on the dial face of the gage 46 of the actuating tensiometer 42, as shown in FIG. 1, and on the magnetically-actuated reed switch 80A mounted on the dial face of the gage 47 of testing tensiometer 42A, not shown in FIG. 1. The input terminals of reed switches 80' and 181' electrically connect to the outputs from the coils 232' and 233' of second and third relays 232/234' and 233/235', respectively. Coils 232' and 233' are shunted by resistances 237' and 239', respectively.

Switch circuit 172' comprises normally-open contacts 234' of relay 232/234' which operationally connect with coil 232' and N.O. contacts 235' of relay 233/235' which operationally connect with coil 233'. The inputs to both sets of contacts 234' and 235' electrically connect to the output of a first cam switch 158-8' also actuated by cam shaft 187'. The input to switch 158-8' electrically connects to the 110-volt A.C. power supply 190'. A second cam switch 158-9', also actuated by cam shaft 187', also has its input electrically connected to the 110-volt A.C. power supply 190'. A third N.O. cam switch 158-10', which again is actuated by the common cam shaft 187' (not shown), again has its input electrically connected to the 110-volt A.C. power supply 190'. A N.O. momentary-contact pushbutton switch 173' electrically connects in parallel circuit with switch 158-10'.

Latching relay circuit 168' comprises a first latching relay 238/194' having the input of its coil 238' electrically connected to the output of contacts 234' of relay 232/234' and its output thereof connected to ground 197'. A second latching relay 240/250' has the input of its coil 240' electrically connected to the output of contacts 235' of relay 233/235' and its output thereof connected to ground 197'. A third latching relay 242 has the input of its coil 242' electrically connected to the output of switch 158-9' of cam-operated timer circuit 158' and its output thereof connected to ground 197'. A fourth latching relay 244 has the input of its coil 244 electrically connected to the outputs of parallel-connected N.O. pushbutton switch 173 and cam-operated switch 158-10' in shunt therewith and its output thereof connected to ground 197'.

A beacon light circuit 246' comprises a beacon light 248' having its input electrically connected to the output from N.O. contacts 250' of latching relay 240/250' and its output connected to ground 197'. The input to contacts 250' electrically connects to the 110-volt A.C. power supply 190'.

In the latching relay circuit 168', the contacts 194' operationally connect with the latching relay 238/194', the contacts 250' operationally connect with the latching relay 240/250'.

In the operation of the alternate version of this invention incorporating time delay, FIG. 1 shows that back flow of water into the pump 20 is prevented by maintaining pressure in the pipeline 18 from the time that the supply valve 16 is opened into the irrigation system until it is finally shut off. This requires that the pump motor 50 be started before the valve 16 is opened and that motor 50 be still running after the valve 16 is closed. Power from latching relay circuit 68 energizes an "On" delay relay, an S.P.S.T. normally-open relay, and an "Off" delay relay in time delay circuit 54. The On delay relay in circuit 54 causes a time lag in the operation of the supply valve 16. The S.P.S.T. relay through the Off delay relay in circuit 54 starts the pump motor 50. When power is removed from the point at the output of switch 196', the On delay relay in circuit 54 opens its contacts immediately. The Off delay relay in circuit 54 keeps the pump motor 50 operating for the designed time lag.

N.O. button switches 156' comprising individual switches 156-2' through 156-6', as shown in FIG. 5, can be set for optional 4, 6, 8, 12 and 14 hour water control periods, respectively. Button switch 156-7' bypasses all the cam switches 158-1' through 158-6' and provides for continuous irrigation. Button switch 156-1, which has no electrical connection, when depressed, opens interlocking switches 156-2 through 156-7 so that only the basic one-hour flushing period is available from cam 158-1 to the input of switch 196. Cam switch 158-1' provides a daily irrigation time of 1 hour unless its circuit is opened by the 24-hour on-off switch 196'. Cam switch 158-1' and switch 156-7' are connected to bypass the switch 194' and go directly to time-delay relays 200/220' and 206/210'. Cam switches 158-2' through 158-6' go through contacts 194' of latching relay 238/194' to time-delay relays 200/220' and 206/210'.

Tensiometers 42 and 42A operate high-impedance relays 232/234' and 233/235', respectively, through step-down transformer 228'. Relay coil 232' is in series with actuating tensiometer 42. Relay coil 233' is in series with testing tensiometer 42A. When tensiometer 42 indicates that more moisture is required than can be supplied during the basic one-hour period, the relay 232/234' closes its contacts and actuates latching relay 238/194'. Latching relay 238/194' connects in one of cam switches 158-2' through 158-6' that have been previously selected by the operator pushing a button choosing a 156-2' through 156-6' water control period to add to the first hour's irrigation.

In the event that the moisture content in the soil at the control point does not attain the setpoint amount working under the limitation of amount of water supplied during any one water control period fixed by the particular button of hand switches 156' chosen, testing tensiometer 42A actuates latching relay 240/250' through 4elay 233/235'. This operates the beacon light 248' which calls attention to the need for correcting the choice of irrigation times. At the time of the irrigating period, cam switch 158-9' closes and energizes relay coil 242, which restores relay 238/194', with whose armature it latches, to the pretest position. At the end of the irrigation period, cam switch 158-10' closes and energizes relay coil 244, which restores relay 240/250', with whose armature it latches, to the pretest position. This action opens contacts 250 and turns off the beacon 248'. Normally-open, momentary-contact pushbutton 173', which is connected in parallel with cam switch 158-10', permits the operator to turn off the beacon 248' at any time prior to the closing of switch 158-10'.

In an irrigation system where there is a considerable distance for the water to seep from the emitter 10 through the soil to control point 41, as shown in FIG. 1, the phase lag in flow change at the control point 41 with respect to that at the outlet from pump 20 can lead to flow instability and overshoot in the delivery of water from the emitter 10. The result is an error in the soil moisture content at the control point 41 relative to the reference moisture content, R, as set by setpoint 82 on the dial 47 of gage 46.

Referring to the schematic of the irrigation system feed-forward and feedback circuits including the controller, as shown in FIG. 7, the dynamic error in soil moisture content at the control point 41 is related to the preselected moisture content at that point, R, as set on the dial 47 of gage 46 by the irrigation manager, and a feedback variable, $f(t)$, through an algebraic summation process carried out in a comparator, C, by the following equation:

$$E(t) = R - F(t) \qquad (1)$$

The feedback variable, $F(t)$, is related to the controlled moisture content, $C(t)$, at the control point 41 by multiplication with an algebraic function, $H(s)$, which is a characteristic of the feedback loop of the system, as follows:

$$F(t) = H(s) \times C(t) \qquad (2)$$

The controlled moisture content, $C(t)$, in the soil at the control point 41 is related to the dynamic error in soil moisture content, $E(t)$, by multiplication with the algebraic function, $G(s)$, which is a characteristic of the overall feed-forward loop of the system, as follows:

$$C(t) = G(s) \times E(t) \quad (3)$$

By combining equations (1), (2) and (3), the relation between the dynamic error, $E(t)$, the reference setpoint, R, and the open loop transfer function, $G(s) \times H(s)$, which is a characteristic of the feed-forward and feedback loops of the system, is derived:

$$E(t) = \frac{R}{1 + G(s) \times H(s)} \quad (4)$$

which states the important conclusion that for minimum dynamic error in soil moisture content at the control point 41, the open loop transfer function of the system, $G(s) \times H(s)$, must be large and in no case have a critical real value equal to or approaching −1.0, or dynamic instability and overshoot of the supply of water from the emitter 10 will ensue.

In the control of an irrigation system, the feed-forward loop transfer function is the product of the individual element transfer functions in the feed-forward loop as follows:

$$G(s) = G_f(s) \times G_m(s) \times G_p(s) \times G_1(s) \times G_s(s) \quad (5)$$

where:
- $G_f(s)$ — Control circuit 77 transfer function.
- $G_m(s)$ = Motor magnetic starter 52 transfer function.
- $G_p(s)$ = Pump 20 transfer function.
- $G_1(s)$ = Pipeline 14 transfer function.
- $G_s(s)$ = Emitter 10 to control point 41 water seepage transfer function.

The product of the first two terms of equation (5) is the controller transfer function, as follows:

$$G_c(s) = G_f(s) \times G_m(s) \quad (6)$$

In a similar manner, the feedback loop transfer function is:

$$H(s) = H_i(s) \times H_g(s) \times H_s(s) \quad (7)$$

where:
- $H_i(s)$ = Moisture sensor 42 transfer function.
- $H_g(s)$ = Vacuum gage 46 transfer function.
- $H_s(s)$ = comparator 39 transfer function.

combining equations (5) and (7), gives the open-loop transfer function, $G(s) \times H(s)$, of the irrigation system which, for stability, must be large and in no case have a critical real value equal to or approaching −1.0:

$$G(s) \times H(s) = G_f(s) \times G_m(s) \times G_p(s) \times G_1(s) \times G_s(s) \\ \times H_i(s) \times H_g(s) \times H_s(s) \quad (8)$$

In equations (5), (6) and (8), the soil water seepage transfer function, $G_s(s)$, is approximated by the equation:

$$G_s(s) = [1 - T_s s] \quad (9)$$

where:
- $T_s$ = Emitter 10 to control point 41 water seepage time constant.

The controlled moisture content, $C(t)$, in equation (3), may also be expressed as the product of the individual element transfer functions in the feed-forward loop as follows:

$$C(t) = G_c(s) \times G_p(s) \times G_1(s) \times G_s(s) \times E(t) \quad (4')$$

If the water seepage time constant of the soil $T_s$, in equation (9) is large, as is generally true of irrigation systems, the open-loop transfer function of the system, $G(s) \times H(s)$, approaches −1.0 so that the denominator of equation (4) approaches a value of zero. In such a case, dynamic instability and overshoot of the controlled moisture content at the control point 41 will occur.

In order to compensate for large water seepage time constant, $T_s$, in irrigation systems, the value of the control element transfer function can be reduced by introducing a controlled water supply transfer function, $D_p(s)$, in the control element transfer function, $G_c(s)$, after the control circuit 77 and before the motor magnetic starter 52, as shown in FIG. 8. the controlled water supply transfer function, $D_p(s)$, as characterized in the aggregate by the transfer function, $G_c(s)$, limits the supply of water from the pump 20 to a preselected value over which the system is incapable of delivering. On a pulse basis this limitation on water that can be dispensed to the system is accomplished by preselecting water control periods of increasing length until sufficient water is available to attain the moisture content desired.

It will be understood that details of the construction of those shown may be altered or omitted without departing from the spirit of the invention as defined by the following claims.

I claim:

1. In an irrigation system wherein for purposes of soil moisture content control a constant speed motor drives a pump for dispensing water for preselected water control periods and a motor starter means operationally connects with said motor for selectively supplying electrical power thereto, the combination with said motor starting means of a soil moisture content controller comprising:
   a. a soil moisture content sensing means installed at the point for desired soil moisture content control,
   b. a transducer means operationally connected to the output of the soil moisture content sensing means and having a soil moisture content indexing output,
   c. a soil moisture content single setpoint indexing means,
   d. a soil moisture content comparator means operationally connected to the soil moisture content indexing output of the transducer means and to the output of the soil moisture content single setpoint indexing means, and
   e. a water control period selector means operationally connected to the output of the soil moisture content comparator means and to the input to the motor starter means.

2. In a soil moisture content controller for an irrigation system as set forth in claim 1 wherein the soil moisture content sensing means comprises a tensiometer.

3. In a soil moisture content controller for an irrigation system as set forth in claim 2 wherein the transducer means comprises a vacuum gage having a dial face and a vacuum-indexing pointer pivotally mounted thereon.

4. In a soil moisture content controller for an irrigation system as set forth in claim 3 wherein the soil moisture content single setpoint indexing means comprises a soil moisture content setpoint-indexing pointer mounted on the dial face of said vacuum gage and arranged for concentric pivotal relation with respect to the vacuum-indexing pointer thereon.

5. In a soil moisture content controller for an irrigation system as set forth in claim 4 wherein the soil moisture content comparator means comprises:
   a. a permanent magnet mounted on the vaccum-indexing pointer of said vacuum gage radially spaced from the pivotal location thereon, and
   b. a magnetically-actuatable electrical reed switch mounted on the soil moisture content single setpoint-indexing pointer radially spaced from the pivotal location thereon for operational cooperation with the permanent magnet on the vacuum-indexing pointer of said vacuum gage.

6. In a soil moisture content controller for an irrigation system as set forth in claim 1 wherein the water control period selector means comprises a manually-selective, multiple cam-operated electrical switch timing assembly.

7. In the testing of soil moisture content of an irrigation system, a soil moisture content tester comprising:
   a. a soil moisture content sensing means installed at the point for desired soil moisture content testing,
   b. a transducer means operationally connected to the output of the soil moisture content sensing means and having a soil moisture content indexing output,
   c. a soil moisture content single setpoint-indexing means,
   d. a soil moisture content comparator means operationally connected to the soil moisture content indexing output of the transducer means and to the output of the soil moisture content single setpoint-indexing means, and
   e. a warning means operationally connected to the output of the soil moisture content comparator means.

8. In a soil moisture content tester for an irrigation system as set forth in claim 7 wherein the soil moisture content sensing means comprises a tensiometer.

9. In a soil moisture content tester for an irrigation system as set forth in claim 8 wherein the transducer means comprises a vacuum gage having a dial face and a vacuum-indexing pointer pivotally mounted thereon.

10. In a soil moisture content tester for an irrigation system as set forth in claim 9 wherein the soil moisture content single setpoint-indexing means comprises a soil moisture content single setpoint-indexing pointer mounted on the dial face of said vacuum gage and arranged for concentric pivotal relation with respect to the vacuum-indexing pointer thereon.

11. In a controller for an irrigation system as set forth in claim 4 wherein the soil moisture content comparator means comprises:
   a. a permanent magnet mounted on the vacuum-indexing pointer of said vacuum gage radially spaced from the pivotal location thereon, and
   b. a magnetically-actuatable electrical reed switch mounted on the soil moisture content single setpoint-indexing pointer radially spaced from the pivotal location thereon for operational cooperation with the permanent magnet on the vacuum-indexing pointer of said vacuum gage.

12. In an irrigation system wherein for purposes of soil moisture content control and testing a constant speed motor drives a pump for dispensing water for preselected water control periods and a motor starter means operationally connects with said motor for selectively supplying electrical power thereto, the combination with said motor starting means of a soil moisture content controller and a soil moisture content tester comprising:
   a. a first soil moisture content sensing means installed at the point for desired soil moisture content control,
   b. a first transducer means operationally connected to the output of the first soil moisture content sensing means and having a first soil moisture content indexing output,
   c. a first soil moisture content single setpoint indexing means,
   d. a first soil moisture content comparator means operationally connected to the first soil moisture content indexing output of the first transducer means and to the output of the first soil moisture content single setpoint indexing means,
   e. a water control period selector means operationally connected to the output of the first soil moisture content comparator means and to the input to the motor starter means,
   f. a second soil moisture content sensing means installed at the point for desired soil moisture content control,
   g. a second transducer means operationally connected to the output of the second soil moisture content sensing means and having a second soil moisture content indexing output,
   h. a second soil moisture content single setpoint indexing means,
   i. a second soil moisture content comparator means operationally connected to the second soil moisture content indexing output of the second transducer means and to the output of the output of the second soil moisture content single setpoint indexing means, and
   j. a warning means operationally connected to the output of the second soil moisture content comparator means, whereby if the preselected water control period is not sufficient to attain a desired moisture content in the soil at the point for desired soil moisture content control, the warning means calls attention to the need for a selection of a new longer water control period.

13. A soil moisture control system comprising a pump in fluid communication with a reservoir; a pressure relief valve in fluid communication with the outlet from the pump and the reservoir; a shutoff valve in fluid communication with the outlet from the pressure relief valve; a plurality of lateral pipes in fluid communication with the output of the shufoff valve; a pluralitty of runner pipes spaced along and in fluid communication with the lateral pipes; and emitter in fluid communication with the end of each runner pipe; a constant speed motor operationally connected to said pump; a motor starter operationally connected to said motor and to a source of electrical power; a solenoid operationally connected to the shutoff valve; an electrical control circuit operationally connected to the motor starter and to a source of electrical power and to the solenoid having a time delay circuit operationally connected in series with a multiple cam-timer switch assembly and a latching relay circuit; a first tensiometer installed in the soil at the point for moisture content control; a first bourdon tube vacuum gage operationally connected to the first tensiometer; a first soil moisture content single setpoint indexing bar pivotally mounted on the dial face of said first bourdon tube vacuum gage about an axis concentric with the pivot axis of the pointer on the face of said first bourdon tube vacuum gage; a first permanent magnet mounted on the pointer of the first bourdon tube vacuum gage radially spaced from the pivot axis thereof; a first magnetically-actuatable electrical reed switch mounted on the first single setpoint indexing bar radially spaced from the pivotal axis thereof by the same amount that the permanent magnet is spaced from the pivot axis of said pointer; a manually-selective, multiple cam-operated electrical switch timing assembly electrically connected to the output of the first magentically-actuatable electrical reed switch and to the input to the motor starter; a second tensiometer installed in the soil at the point for moisture content control; a second bourdon tube vacuum gage operationally connected to the second tensiometer; a second soil moisture content single setpoint indexing bar pivotally mounted on the dial face of said second bourdon tube vacuum gage about an axis concentric with the pivot axis of the pointer on the face of said second bourdon tube vacuum gage; a second permanent magnet mounted on the pointer of the second bourdon tube vacuum gage radially spaced from the pivot axis thereof; a second magnetically-actuatable electrical reed switch mounted on the second single setpoint indexing bar radially spaced from the pivotal axis thereof by the same amount that the permanent magnet is spaced from the pivot axis of said pointer; and a beacon light electrically connected to the output of the second magnetically-actuatable electrical reed switch.

* * * * *